No. 647,913. Patented Apr. 17, 1900.
T. R. CHERRY.
AWNING.
(Application filed Nov. 22, 1899.)
(No Model.) 2 Sheets—Sheet 2.

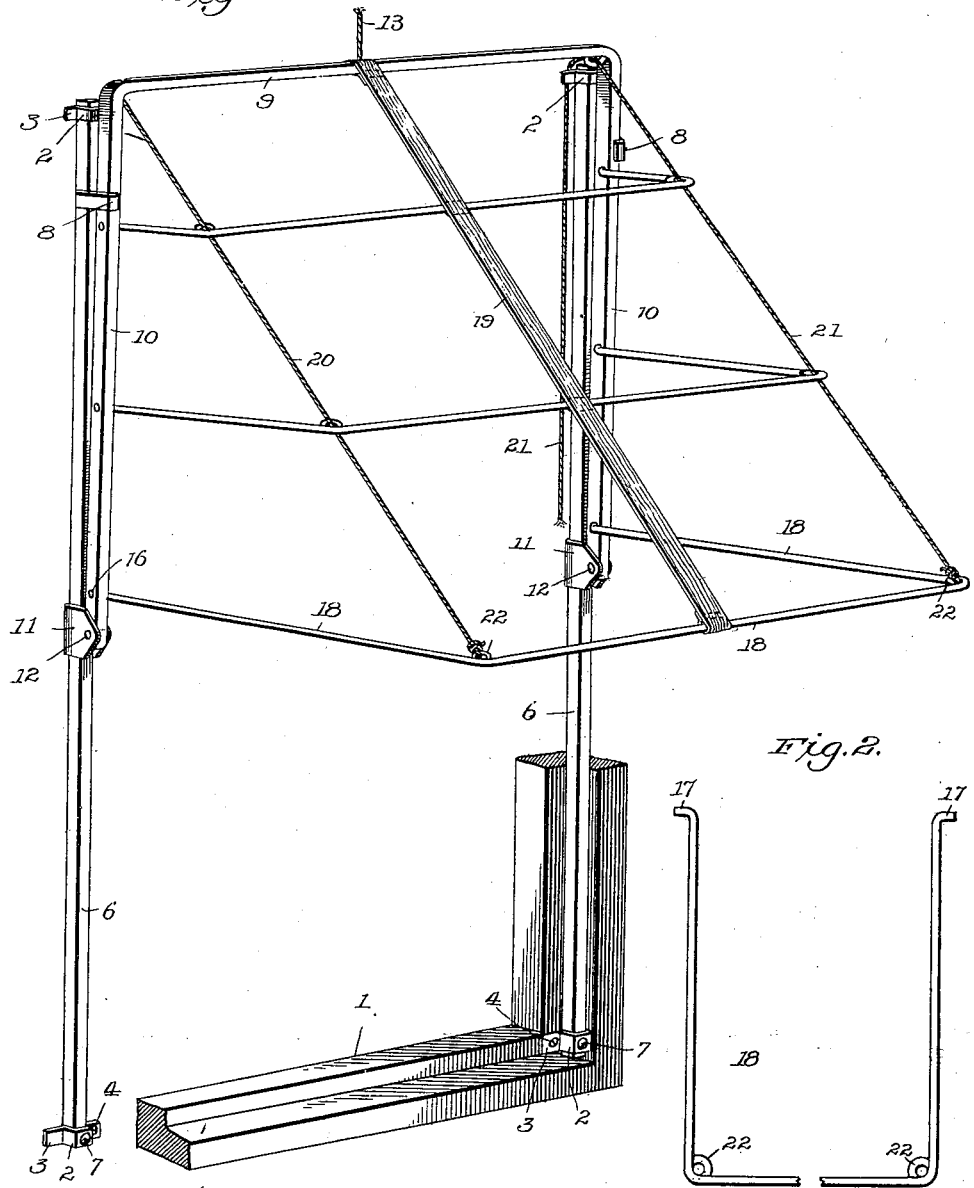

Witnesses
Harry S. Rohrer
B. F. Finck

Inventor
Theron R. Cherry.
By Victor J. Evans
Attorney

UNITED STATES PATENT OFFICE.

THERON R. CHERRY, OF BALTIMORE, MARYLAND, ASSIGNOR TO MARY A. CHERRY, OF SAME PLACE.

AWNING.

SPECIFICATION forming part of Letters Patent No. 647,913, dated April 17, 1900.

Application filed November 22, 1899. Serial No. 737,892. (No model.)

*To all whom it may concern:*

Be it known that I, THERON R. CHERRY, a citizen of the United States, residing at Baltimore, in the State of Maryland, have invented certain new and useful Improvements in Awnings, of which the following is a specification.

My invention relates to awnings for windows; and its primary object is to provide an awning capable of being adjusted vertically to any desired position on the window-frame and of being reversed, as hereinafter described.

A further object of the invention is to provide a simple, inexpensive, and durable awning which may be easily and quickly folded up and also adjusted toward or from the top of the window.

The construction of the invention will be fully described hereinafter in connection with the accompanying drawings, which form a part of this specification, and its novel features will be defined in the appended claims.

Figure 3:
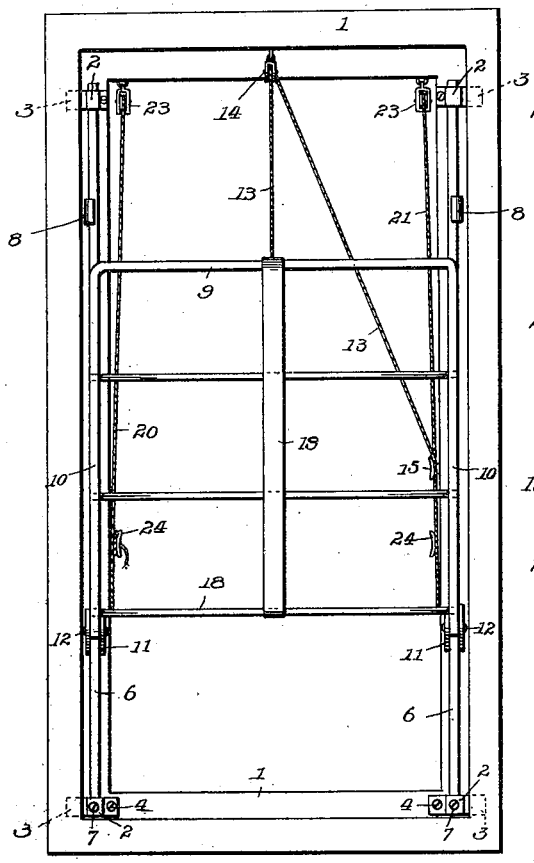
Figure 4:
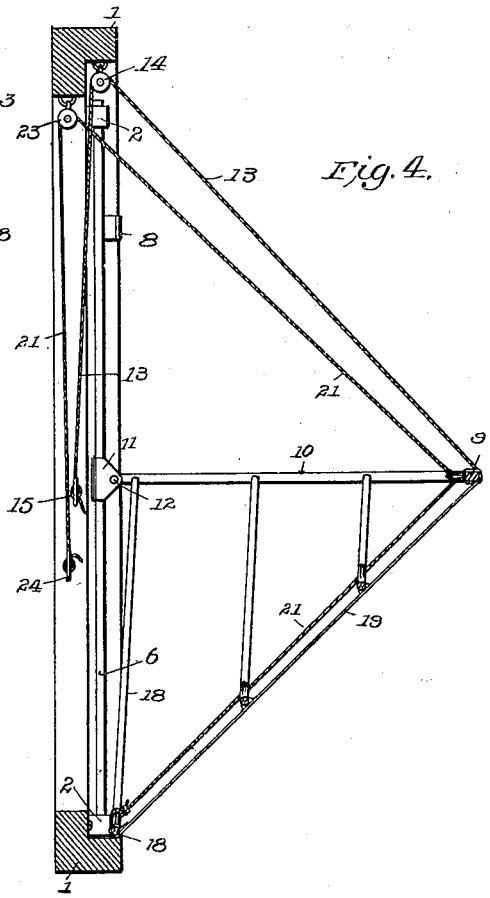
Figure 5:
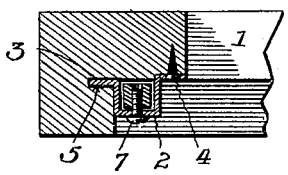
Figure 6:
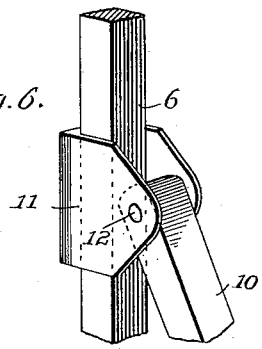

In the drawings, Figure 1 is a view in perspective of an awning embodying the invention in position upon a window-frame, the cover of the awning being omitted to better show the construction. Fig. 2 is a plan view of one of the pivoted bails of the frame detached. Fig. 3 is a front elevation showing the awning-frame lowered from the top of the window-frame. Fig. 4 is a vertical section showing the awning-frame reversed to cover the lower half of the window. Fig. 5 is a horizontal section of one of the brackets for securing the guide-rods of the awning, and Fig. 6 is a detail perspective of one of the hinge-supports of the frame.

The reference-numeral 1 designates a window-frame, to which are secured at top and bottom brackets, each comprising a vertically-disposed sleeve or socket 2 and oppositely-projecting ears 3. The inwardly-projecting ears of the brackets are secured to the window-frame by screws 4, and the outwardly-extending ears thereof project within recesses 5, formed in the window-frame. At each side of the window-frame is secured a rod 6, said rods constituting the supporting-guides for the awning-frame and having their ends supported within the sockets 2. The length of these rods 6 is preferably slightly less than the distance between the top and bottom cross-bars of the window-frame, and their lower ends are formed with threaded openings to receive screws 7, passing through the lower brackets. The upper ends of the rods 6 rest loosely within these bracket-supports. This construction permits of the ready attachment and removal of the guide-rods and at the same time firmly secures them in position upon the window-frame. The rods 6 are also preferably provided with oppositely-arranged angle-brackets 8, serving as guards or guides for the awning-frame when it is moved vertically.

The main frame of the awning comprises a horizontal rod or bar 9 and parallel sides 10, the ends of which are pivotally secured to adjustable brackets or yokes 11 by pivot-rods 12. Each of the brackets or yokes 11 is of U shape in cross-section to embrace the guide-rods 6 and formed with openings serving as bearings for the pivots 12 of the frame.

13 designates a cord attached at one end to the center of the cross-bar 9 and passing over a pulley 14 at the top of the window-frame. By means of this cord the awning-frame may be readily lowered to permit of the admission of air above the awning, and by securing the free end of the cord to a hook 15, projecting from one side of the window-frame, the awning may be held at any position to which it is adjusted.

The sides 10 of the frame are formed with openings 16 for the reception of the oppositely-projecting pivots 17 of a bail 18, to which the lower end of the awning-cover (not shown) is attached. The pivots 17, as shown, project at right angles to the parallel sides of the bail, and their outer ends are upset to effect their secure attachment to the frame.

While a single bail 18 would suffice, I preferably employ a plurality of said bails, three being shown in the drawings, graduated in size, but all pivotally secured to the frame in the manner above described.

19 designates a flexible strap connecting the cross-bar 9 and the bail or bails 18 centrally.

20 and 21 designate pull-cords for folding up the awning, secured to eyes 22, attached to the angles of the lower bail 18, and passing through similar eyes secured to the angles of the other bails and the main frame and passing over suitable pulleys, as 23, and adapted to be secured to a hook 24 on the window-frame.

It will be obvious from the foregoing description, in connection with the drawings, that the awning is not only capable of being adjusted vertically to admit air and light at the upper portion of the window, but may even be turned to the reversed position, (shown in Fig. 4,) with the bail 18 resting on the window-sill and the frame of the awning at right angles to the window-frame.

The reversal of the awning is accomplished as follows: The main frame is lowered by the cord 13 until the cross-bar 9 is below the guide-brackets 8, after which the main frame 9 and 10 may be turned down on its pivots 12 to a horizontal position, with the bail 18 resting on the window-sill in a substantially-vertical position, as shown in Fig. 4. The awning is restored to normal position by drawing on the cord 13, which first raises the frame 9 10 to a vertical position and then draws it up to the top of the window-frame. The yokes 11 are prevented from slipping down after the frame 10 has passed the guides 8 by grasping with the hand one side of the frame or the bail 18, attached thereto. Then by relaxing the cord 13 the frame is allowed to turn on its pivotal supports to reverse the awning, as above described.

I would have it understood that the invention is not restricted to all of the details shown and described and that I reserve the right to make all such variations and modifications therein as may fall within the scope of the following claims.

I claim—

1. The combination with a window-frame, of guide-rods secured to opposite sides thereof; adjustable brackets or yokes on said rods; an awning-frame pivotally secured to said brackets or yokes; a bail pivotally secured to said frame; and means for raising and lowering said frame and bail.

2. The combination with a window-frame, of brackets secured to opposite sides of the frame; guide-rods removably secured by said brackets; brackets or yokes movably secured on said rods; an awning-frame pivotally secured to said movable brackets or yokes; a bail or bails pivotally secured to said frame; and cords for raising and lowering the frame and bails.

3. An awning comprising rods adapted to be secured in vertical position at opposite sides of a window-frame; brackets or yokes movable on said rods; an awning-frame pivotally secured to said brackets or yokes; a bail pivoted to said frame; means for raising and lowering the frame and bail; and guards projecting from the guide-rods to guide the frame in its movement.

In testimony whereof I affix my signature in presence of two witnesses.

THERON R. CHERRY.

Witnesses:
E. WALTON BREWINGTON,
HENRY S. BREWINGTON.